United States Patent
Xu et al.

(10) Patent No.: US 12,406,438 B2
(45) Date of Patent: Sep. 2, 2025

(54) INDOOR SCENE VIRTUAL ROAMING METHOD BASED ON REFLECTION DECOMPOSITION

(71) Applicant: ZHEJIANG UNIVERSITY, Zhejiang (CN)

(72) Inventors: Weiwei Xu, Hangzhou (CN); Jiamin Xu, Hangzhou (CN); Xiuchao Wu, Hangzhou (CN); Zihan Zhu, Hangzhou (CN); Hujun Bao, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 179 days.

(21) Appl. No.: 18/490,790

(22) Filed: Oct. 20, 2023

(65) Prior Publication Data
US 2024/0169674 A1     May 23, 2024

Related U.S. Application Data

(63) Continuation of application No. PCT/CN2021/088788, filed on Apr. 21, 2021.

(51) Int. Cl.
*G06V 10/56* (2022.01)
*G06N 3/04* (2023.01)
(Continued)

(52) U.S. Cl.
CPC ............. *G06T 17/205* (2013.01); *G06T 5/92* (2024.01); *G06T 7/13* (2017.01); *G06T 7/40* (2013.01); *G06T 7/80* (2017.01); *G06V 10/56* (2022.01)

(58) Field of Classification Search
CPC ........... G06T 17/205; G06T 5/92; G06T 7/13; G06T 7/40; G06T 7/80; G06T 15/50;
(Continued)

(56) References Cited

U.S. PATENT DOCUMENTS

2015/0178988 A1   6/2015  Montserrat Mora et al.
2019/0325644 A1*  10/2019  Bleyer .................. G06T 17/20

FOREIGN PATENT DOCUMENTS

CN       104318622 A  *  1/2015  ............. G06T 17/30
CN       106097443 A  *  11/2016  ............. G06T 17/05
(Continued)

OTHER PUBLICATIONS

International Search Report (PCT/CN2021/088788); Date of Mailing: Jan. 18, 2022.
(Continued)

*Primary Examiner* — Said Broome
*Assistant Examiner* — Denis Vasiliy Minko
(74) *Attorney, Agent, or Firm* — Wiersch Law Group

(57) ABSTRACT

Disclosed in the present invention is an indoor scene virtual roaming method based on reflection decomposition, the method includes: firstly, by means of three-dimensional reconstruction, obtaining a rough global triangular mesh model projection as an initial depth map, aligning depth edges to color edges, and converting the aligned depth map into a simplified triangular mesh; checking planes in the global triangular mesh model, and if a certain plane is a reflection plane, constructing a double-layer expression in a reflection area for each picture in which the reflection plane is visible, so as to correctly render the reflection effect on an object surface; and giving a virtual viewport, using neighborhood pictures and the triangular mesh to draw a picture of the virtual viewport, and for the reflection area, using foreground and background pictures and foreground and background triangular meshes to perform drawing.

6 Claims, 4 Drawing Sheets

(51) Int. Cl.
*G06T 5/92* (2024.01)
*G06T 7/13* (2017.01)
*G06T 7/40* (2017.01)
*G06T 7/80* (2017.01)
*G06T 15/04* (2011.01)
*G06T 15/50* (2011.01)
*G06T 17/20* (2006.01)

(58) Field of Classification Search
CPC ....... G06T 15/04; G06T 15/205; G06T 17/20; G06V 10/56; G06N 3/04
See application file for complete search history.

(56) References Cited

FOREIGN PATENT DOCUMENTS

| | | | | | |
|---|---|---|---|---|---|
| CN | 109064533 | A | | 12/2018 | |
| CN | 110288712 | A | | 9/2019 | |
| CN | 110458939 | A | | 11/2019 | |
| CN | 111652963 | A | | 9/2020 | |
| JP | 2008186456 | A | * | 8/2008 | ............... G06T 7/55 |
| TW | 201632982 | A | * | 9/2016 | ............... G06T 7/55 |

OTHER PUBLICATIONS

Multi-View-Depth-Map-Sampling-for-3D-Reconstruction-of-Natural-Scene.
EpicFlow: Edge-Preserving-Interpolation-of-Correspondences-for-Optical-Flow.

\* cited by examiner

INDOOR SCENE VIRTUAL ROAMING METHOD BASED ON REFLECTION DECOMPOSITION

CROSS-REFERENCE TO RELATED APPLICATION

The present application is a continuation of International Application No. PCT/CN2021/088788, filed on Apr. 21, 2021, the content of which is incorporated herein by reference in their entirety.

TECHNICAL FIELD

The present disclosure relates to the technical field of image-based rendering and virtual viewpoint synthesis, and in particular to a method for virtual roaming in an indoor scene by combining image-based rendering technology with reflection decomposition.

BACKGROUND

The purpose of indoor scene virtual roaming is to build a system, which gives the internal and external parameters of a virtual camera and outputs the drawn pictures of virtual viewpoints. At present, the mature virtual roaming application is mainly based on a series of panoramic pictures, and the virtual roaming in the form of pure rotation can be carried out around each panoramic picture. Most systems use simple interpolation for movement between panoramic pictures, and thus the visual error is relatively large. For virtual roaming with large degrees of freedom, there are many methods that have realized observation at the object level or observation of a part of the scene with viewpoint movement, including explicitly obtaining the light field around the target object by using a light field camera, see Gortler, Steven J., et al. "The lumigraph." Proceedings of the 23rd annual conference on Computer graphics and interactive techniques. 1996, or using the pictures taken by ordinary cameras to express and interpolate the scenes by using neural networks, see Mildenhall, Ben, et al. "Nerf: Representing scenes as neural radiance fields for view synthesis." Proceedings of the European Conference on Computer Vision. 2020. For large indoor scenes, the latest methods can render relatively free viewpoints, but the rendering effect is still not good enough, see Riegler and Koltun. "Free View Synthesis." Proceedings of the European Conference on Computer Vision. 2020. Especially, for all kinds of reflection types (ground, table, mirror, etc.) existing in large indoor scenes, there is still no system that can handle indoor roaming with such complex materials well.

SUMMARY

In view of the shortcomings of the prior art, the present disclosure provides an indoor scene virtual roaming method based on reflection decomposition, which is able to perform virtual roaming with a large degree of freedom in a larger indoor scene with a reflection effect under the condition of less storage requirements.

In order to achieve the above object, the present disclosure adopts the following technical solutions: an indoor scene virtual roaming method based on reflection decomposition includes the following steps:

S1, capturing pictures sufficient for covering a target indoor scene, carrying out three-dimensional reconstruction for the indoor scene based on the captured pictures, obtaining a rough global triangular mesh model of the indoor scene and the internal and external parameters of the cameras;

S2, for each picture, projecting the global triangular mesh model into a corresponding depth map, aligning depth edges to color edges, converting the aligned depth map into a triangular mesh, and performing mesh simplification on the triangular mesh;

S3, detecting a plane in the global triangular mesh model, and detecting whether the plane is a reflection plane by means of color consistency between adjacent images; if so, constructing a double-layer expression on a reflection area for each picture in which the reflection plane is visible to correctly render a reflection effect of an object surface; in an embodiment, the double-layer expression includes double-layer triangular meshes of foreground and background and two decomposed pictures of foreground and background. In an embodiment, a foreground triangular mesh is used for expressing object surface geometry, and a background triangular mesh is used for expressing a mirror image of a scene geometry on the reflection plane; a foreground picture is used for expressing object surface textures after removing reflection components, and a background picture is used for expressing the reflection components of the scene on the object surface; specifically following sub-steps are included:

S31, detecting planes in the global triangular mesh model, reserving planes with an area larger than an area threshold, projecting the planes onto visible pictures, and recording a set of pictures in which the planes are visible as $\mathcal{H}$; for each picture $I_k$ in $\mathcal{H}$, calculating a set $\mathcal{N}_k$ of K neighboring pictures thereof. In an embodiment, the calculation of K neighbors is obtained according to an ordering of overlapping rate of vertices in the global triangular mesh model after plane reflection;

constructing a matching cost volume using $\mathcal{N}_k$, determining whether the plane has enough reflection components in the picture $I_k$. In an embodiment, a determining method is as follows: for each pixel, after mirroring the global triangular mesh model according to a plane equation, finding a cost corresponding to a mirrored depth value in the matching cost volume, and determining whether a cost position is a local minimum point; if a number of pixels of the local minimum points of a cost in the picture is greater than a pixel number threshold, considering that the plane has reflection components in the picture; if a number of visible pictures with reflection components in a certain plane is greater than a picture number threshold, considering the plane to be the reflection plane;

S32, for each reflection plane, calculating a two-dimensional reflection area $\beta_k$ thereof on each visible picture, specifically: projecting the reflection plane onto the visible picture to obtain a projected depth map, expanding the projected depth map, and then comparing the expanded projected depth map with the aligned depth map to obtain an accurate two-dimensional reflection area; for each pixel with a depth value in the projected depth map, screening by three-dimensional point distances and normal included angles, and taking a screened pixel area as the reflection area $\beta_k$ of the reflection plane on the picture;

S33, constructing a double-layer expression on the reflection area for each picture in which the reflection plane is visible, specifically: taking the projected depth map as an initial foreground depth map, mirroring internal and external camera parameters of the picture into a virtual camera according to the plane equation, then rendering the initial background depth map in the virtual camera by using the global triangular mesh model, and converting initial foreground and background depth maps into simplified two layers of triangular meshes $M_k^0$ and $M_k^1$;

calculating two layers of foreground and background pictures $I_k^0$ and $I_k^1$ by an iterative optimization algorithm, and further optimizing $M_k^0$ and $M_k^1$. In an embodiment, all related original pictures are subjected to an inverse gamma correction in advance for subsequent decomposition;

an optimization objective is to minimize the following energy function:

$$\operatorname*{argmin}_{(R,T)_k^1, M_k^{0,1}, I_k^{0,1}} E_d + \lambda_s E_s + \lambda_p E_p, \text{ s.t. } I_k^{0,1}(u) \in [0, 1]$$

where, $(R, T)_k^1$ in the optimization objective represents a rigid body transformation of a triangular mesh of a reflection layer, and initial values thereof are identity matrix and O respectively, and $M_k^0$ and $M_k^1$ only optimize the three-dimensional positions of mesh vertexes without changing topological structures; $E_d$, $E_s$ and $E_p$ are a data item, a smoothing term and a prior term respectively, and $\lambda_s$, $\lambda_p$ are the weights of respective items, and u indicates a pixel in $I_k^{0,1}$; specifically:

$$E_d = \sum_{k' \in \mathcal{N}_k} \sum_u \|\hat{I}_k(u) - I_k(u)\|^2$$

$$\hat{I}_k(u) = I_k^0(\omega^{-1}(u, D_k^0)) + \beta_k(\omega^{-1}(u, D_k^0)) I_k^1(\omega^{-1}(u, D_k^1))$$

$$E_s = \sum_u (e^{-\nabla I_k^{0,1}(u)} \|\nabla I_k^{0,1}(u)\|^2) + \sum_v \|HM_k^{0,1}(v)\|^2$$

$$E_p = \sum_u (\|I_k^0(u)\|^2) + \sum_u (\|I_k^1(u)\|^2)$$

where H is a Laplace matrix; a function $\omega^{-1}$ returns two-dimensional coordinates, and projects the point u in an image $I_{k'}$ to an image $I_k$ according to the depth value and the internal and external camera parameters; $D_k^{0,1}$ represents the depth map obtained by projection of $M_k^{0,1}$; v represents a vertex in $M_k^{0,1}$;

in order to minimize the above energy function, an alternating optimization solutions is used, and for each round of optimization, $(R, T)_k^1$ and $M_k^{0,1}$ are fixed first, $I_k^{0,1}$ is optimized. In an embodiment, an initial value of $I_k^{0,1}$ is calculated by the following formula:

$$I_k^0(u) = \min(\{I_{k'}^0)(\omega^{-1}(u, D_k^0))| k' \in \mathcal{N}_k\})$$

$$I_k^1(u) = I_k(u) - i_k^0(u)$$

the initial value is given, a nonlinear conjugate gradient method is used for optimization; next, $I_k^{0,1}$ is fixed, and $(R, T)_k^1$ and $M_k^{0,1}$ are optimized, for which the conjugate gradient method is also used; one alternation is one round of optimization, and two rounds of optimization in total are carried out for the whole optimization process, and after a first round of optimization, $I_k^{0,1}$ after the first round of optimization is denoised by consistency constraint of foreground pictures among multiple viewports, specifically: $I_k^0$ and $I_k^1$ after the first round of optimization are known, $k' \in \mathcal{N}_k$, and denoised images $\tilde{I}_k^0$ and $\tilde{I}_k^1$ are obtained by using the following formula:

$$\tilde{I}_k^0(u) = \operatorname{median}(\{I_{k'}^0(\omega^{-1}(u, D_k^0)) \mid k' \in \mathcal{N}_k\})$$

$$\tilde{I}_k^1(u) = \begin{cases} I_k(u) - \tilde{I}_k^0(u) & \text{if } I_k(u) - \tilde{I}_k^0(u) - I_k^1(u) < 0 \\ I_k^1(u) & \text{otherwise} \end{cases}$$

a second round of optimization is continually carried out using $\tilde{I}_k^0(u)$ and $\tilde{I}_k^1(u)$ as the initial values of $I_k^{0,1}$, and further, a prior term is added to a total energy equation in the second round of optimization:

$$\lambda_g(\Sigma_u \|I_k^0(u) - \tilde{I}_k^0(u)\|^2 + \Sigma_u \|I_k^1(u) - \tilde{I}_k^1(u)\|^2)$$

where $\lambda_g$ is the weight of the prior term for constraining the second round of optimization;

after two rounds of optimization, final two layers of a simplified triangular mesh $M_k^{0,1}$ and a decomposed $I_k^{0,1}$ are obtained by converting $M_k^1$ with $(R, T)_k^1$ for correctly rendering the reflection effect of the object surface; and S4, giving a virtual viewport, drawing a virtual viewport picture by using neighborhood pictures and triangular meshes, and for the reflection area, performing drawing by using foreground and background pictures and foreground and background triangular meshes, specifically: drawing the reflection area $\beta_k$ in a neighborhood picture to a current virtual viewpoint to obtain a reflection area $\beta_n$ of the current virtual viewpoint. In an embodiment, for pixels in the reflection area, drawing is performed by using two layers of foreground and background pictures and simplified triangular meshes, and calculation of the depth map and color blending are performed for two layers of images respectively; since the two layers of pictures $I_k^0$ and $I_k^1$ are obtained by decomposition after inverse gamma correction, the two layers of blended images are added in a rendering stage, and a gamma correction is carried out once to obtain correct pictures with a reflection effect.

Further, in S2, the step of aligning the depth edges of the depth map to the color edges of the original picture to obtain the aligned depth map is specifically as follows:

firstly, a normal map corresponding to the depth map is calculated, then a depth value $d_i$ of each pixel i in the depth map is converted into a three-dimensional point $v_i$ in a local coordinate system according to the camera internal parameters, and a plane distance $dt_{ij} = \max(|(v_i - v_j) \cdot n_i|, |(v_i - v_j) \cdot n_j|)$ between adjacent points i,j is calculated, where $n_i$, $n_j$ are the normal vectors of the points i,j respectively; if $dt_{ij}$ is greater than $\lambda * \max(1, \min(d_i, d_j))$, the pixel is recorded as a depth edge pixel, where $\lambda$ is an edge detection threshold;

for each picture, after all the depth edge pixels are obtained, local two-dimensional gradients of the depth edges are calculated by Sobel convolution, and then each depth edge pixel is taken as a starting point, and pixels are traversed one by one along an edge two-dimensional gradient direction and an opposite direction thereof at the same time until a color edge pixel is traversed at either one of the two sides; after the color edge pixel is traversed, the depth values of all pixels in a middle path from the starting pixel to the color edge pixel are deleted; the pixels the depth values of which are deleted are defined as misaligned pixels, and the pixels the depth values of which are not deleted are defined as aligned pixels; for each deleted depth value, interpolation filling is performed by using surrounding undeleted depth values.

Further, for each deleted depth value, interpolation filling is performed by using the surrounding depth values that are not deleted, specifically: for each misaligned pixel $p_i$ to be interpolated, a geodesic distance $d_g(p_i, p_j)$ from the pixel $p_i$ to all other aligned pixels is calculated, and the m nearest aligned pixels are found by using the geodesic distance, and an interpolated depth value $$d_i = \sum_{j \in \mathcal{N}_i} \frac{w_g(i,j)}{\sum_k w_g(i,k)} \hat{d}_i^j$$

is calculated, where $\mathcal{N}_i$ represents a set of nearest aligned pixels of the pixel $p_i$, $w_g(i,j) = \exp(-d_g(p_i, p_j))$, and $\hat{d}_i^j$ represents the projection of the pixel $p_i$ onto a local plane equation of $p_i$, the local plane equation being calculated from $v_j$ and $n_j$.

Further, in S4, a set of neighborhood pictures is calculated according to the internal and external parameters of the virtual camera, and the local coordinate system of the current virtual camera is divided into eight quadrants according to a coordinate axis plane, and a series of neighborhood pictures are further selected in each quadrant, and each quadrant is further divided into several areas by using an included angle $\angle(R_k^z, R_n^z)$ between an optical center direction $R_k^z$ of a picture and an optical center direction $R_n^z$ of the virtual camera and a distance $\|t_k - t_n\|$ between an optical center $t_k$ of the picture and an optical center $t_n$ of the virtual camera; next, in each area, one picture with a smallest similarity $d_k$ is selected to be added to the set of neighborhood pictures, $d_k = \angle(R_k^z, R_n^z) * \pi/180 + \lambda \|t_k - t_n\|/\|t_n\|$, where $\lambda$ is a distance proportion weight;

after obtaining the set of neighborhood pictures, each picture in the set of neighborhood pictures is drawn to a virtual viewpoint according to a corresponding simplified triangular mesh, specifically:

a) a robust depth map is calculated, and a rendering cost $c(t_k, t_n, x)$ is calculated for each pixel of a patch shader:

$$c(t_k, t_n, x) = \angle(t_k - x, t_n - x) * \pi/180 + \max(0, 1 - \|t_n - x\|/\|t_k - x\|)$$

where $t_k$ and $t_n$ represent the three-dimensional coordinates of the optical centers of the picture and the virtual camera, x represents a three-dimensional coordinate of a three-dimensional point corresponding to the pixel, and each pixel have a series of triangular patches rendered, where the "point" is used to represent an intersection point of the patch and light ray determined by the pixel; if a rendering cost of a certain point is greater than a minimum rendering cost of all points in the pixel+a range threshold $\lambda$, then the point does not participate in the calculation of the depth map, so that the depths of all points participating in the calculation of the depth map are compared to take a minimum value as the depth value of the pixel; and b) after calculating the depth map of the virtual camera, the picture is taken as a texture map to the triangular mesh for drawing, and for each pixel of the picture of the virtual camera, the colors of the points near the depth map are blended according to a set weight $w_k$ to obtain a final rendered color.

Further, in S4, in order to reduce a storage scale, all pictures are down-sampled to 1/n for storage, n≥1, and a virtual window is set to an original size during rendering.

Further, a super-resolution neural network is trained to compensate for a definition loss caused by down sampling for storing the pictures, and at the same time to reduce possible drawing errors, which is specifically as follows: after each new virtual viewport is rendered to obtain depth pictures and color pictures, a deep neural network is used to reduce rendering errors and improve a definition; the network uses the color pictures and depth pictures of a current frame in addition with the color pictures and depth pictures of a previous frame as an input; firstly, a three-layer convolution network is used to extract features from the depth pictures and color pictures of the current frame and the depth pictures and color pictures of the previous frame respectively, and next, the features of the previous frame are warped to the current frame, and an initial correspondence is obtained by depth map calculation; since the depth map is not completely accurate, an alignment module is further used to fit a local two-dimensional offset to further align the features of a preceding frame and a subsequent frame, and the aligned features of the preceding and subsequent frames are combined and input into the super-resolution module implemented by a U-Net convolution neural network to output high-definition pictures of the current frame.

The present disclosure has the beneficial effects:

1. A large number of captured data can be processed by construction of a complete process and virtual viewpoint roaming with a greater degree of freedom is realized for large-scale indoor scenes;
2. The reflection surface in the indoor scene and the reflection area in the picture are detected, and a double-layer expression is constructed the reflection area, so that the reflection effect can be better rendered during the roaming of the indoor scene, which greatly improves the realism of rendering; and
3. By subsequently connecting a special super-resolution neural network, rendering errors are reduced, and at the same time, the picture resolution necessary to support roaming of a single scene is reduced, thus reducing storage and memory consumption.

DESCRIPTION OF EMBODIMENTS

The present disclosure will be further described in detail with reference to the attached drawings and specific embodiments. It should be understood that the specific embodiments described here are only for explaining the present disclosure and are not intended to limit the present disclosure.

Figure 1:
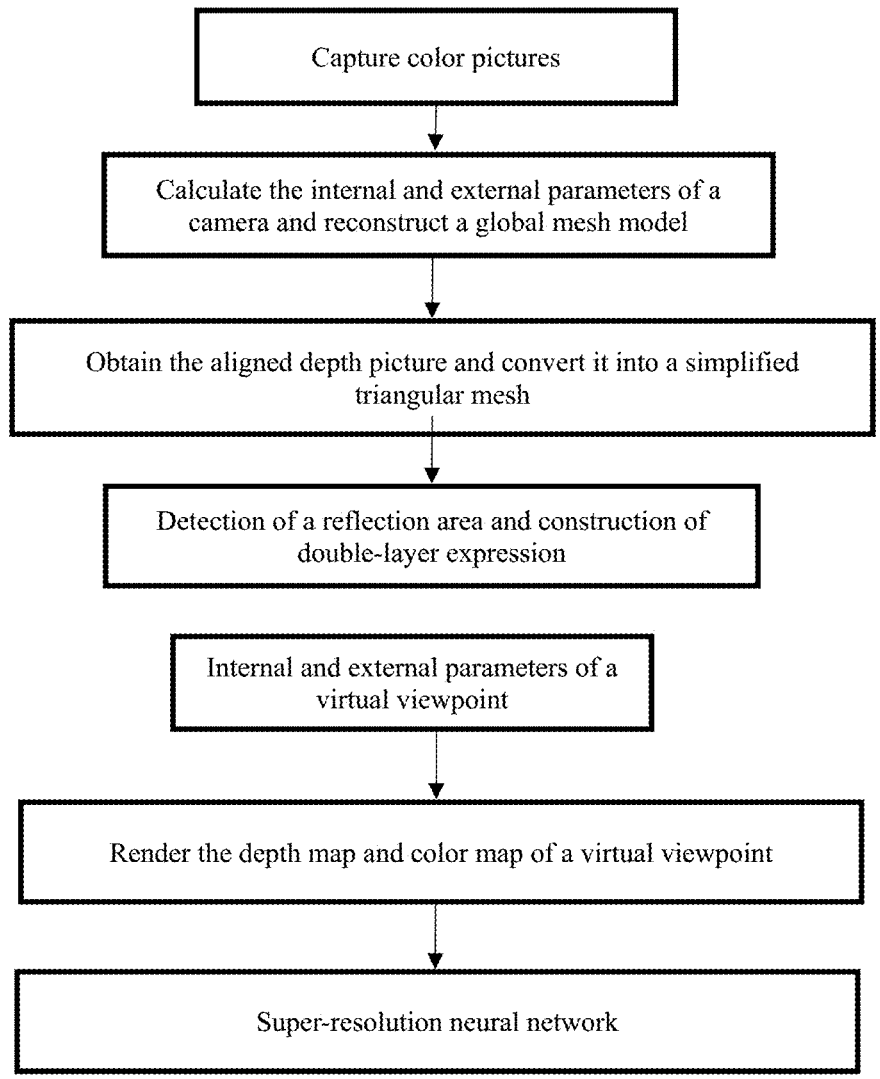
FIG. 1 is a flowchart of an indoor scene virtual roaming method based on reflection decomposition provided by an embodiment of the present disclosure.
Figure 2:
FIG. 2 is a schematic diagram of a global triangular mesh model provided by an embodiment of the present disclosure.

As shown in FIG. 1, an indoor scene virtual roaming method based on reflection decomposition provided by an embodiment of the present disclosure includes the following steps:

(1) pictures sufficient for covering a target indoor scene are captured, three-dimensional reconstruction is carried out for the indoor scene based on the captured pictures, as shown in FIG. 2, to obtain a rough global triangular mesh model of the indoor scene and the internal and external parameters of the cameras.

Specifically, the three-dimensional reconstruction software COLMAP or RealityCapture can be used to obtain the internal and external parameters of the camera and the global triangular mesh model.

(2) For each picture, the global triangular mesh model is projected into a corresponding depth map, depth edges are aligned to color edges, the aligned depth map is converted into a triangular mesh, and mesh simplification is performed on the triangular mesh.

Specifically, since the global triangular mesh model contains some errors, the depth edges of the projected depth map are aligned with the color edges of the original picture to obtain the aligned depth map. The specific steps are as follows:

Firstly, a normal map corresponding to the depth map is calculated, then a depth value $d_i$ of each pixel i in the depth map is converted into a three-dimensional point $v_i$ in a local coordinate system according to the camera internal parameters, and a plane distance $dt_{ij}=\max(|(v_i-v_j)\cdot n_i|, |(v_i-v_j)\cdot n_j|)$ between adjacent points i,j is calculated, where $n_i$, $n_j$ are the normal vectors of the points i,j respectively; if $dt_{ij}$ is greater than $\lambda*\max(1, \min(d_i, d_j))$, the pixel is recorded as a depth edge pixel, where $\lambda$ is an edge detection threshold, and $\lambda=0.01$ in this embodiment.

For each picture, after all the depth edge pixels are obtained, local two-dimensional gradients of the depth edges are calculated by Sobel convolution, and then each depth edge pixel is taken as a starting point, and pixels are traversed one by one along an edge two-dimensional gradient direction and an opposite direction thereof at the same time until a color edge pixel is traversed at either one of the two sides. In an embodiment, color edge pixels are obtained by the Canny edge extraction algorithm; after the color edge pixel is traversed, the depth values of all pixels in a middle path from the starting pixel to the color edge pixel are deleted; the pixels the depth values of which are deleted are defined as misaligned pixels, and the pixels the depth values of which are not deleted are defined as aligned pixels; for each deleted depth value, interpolation filling is performed by using surrounding undeleted depth values, specifically: for each non-aligned pixel $p_i$ to be interpolated, the geodesic distance $d_g(p_i, p_j)$ from the pixel $p_i$ to all other aligned pixels is calculated, see Revaud, Jerome, et al. "Epicflow: Edge-preserving interpolation of correspondences for optical flow." Proceedings of the IEEE conference on computer vision and pattern recognition. 2015, m (m=4 in this embodiment 4) nearest aligned pixels are found according to the geodesic distance, and an interpolated depth value $$d_i = \sum_{j \in \mathcal{N}_i} \frac{w_g(i, j)}{\sum_k w_g(i, k)} \hat{d}_i^j$$

where $\mathcal{N}_i$ represents a set of nearest aligned pixels of the pixel $p_i$, $w_g(i,j)=\exp(-d_g(p_i, p_j))$, and $\hat{d}_i^j$ represents the projection of the pixel $p_i$ onto a local plane equation of $p_j$, the local plane equation being calculated from $v_j$ and $n_j$.

Specifically, after the depth map is aligned, the aligned depth map is converted into a triangular mesh, specifically: the depth value is converted into three-dimensional coordinates, all horizontal and vertical edges are connected and a hypotenuse is connected, and when the depth edge mentioned in the previous step is met, the corresponding edges are disconnected to obtain a triangular mesh.

Specifically, a mesh simplification algorithm is called to simplify the generated triangular mesh, see Garland, Michael, and Paul S. Heckbert. "Surface simplification using quadric error metrics." Proceedings of the 24th annual conference on Computer graphics and interactive techniques. 1997.

Figure 3:
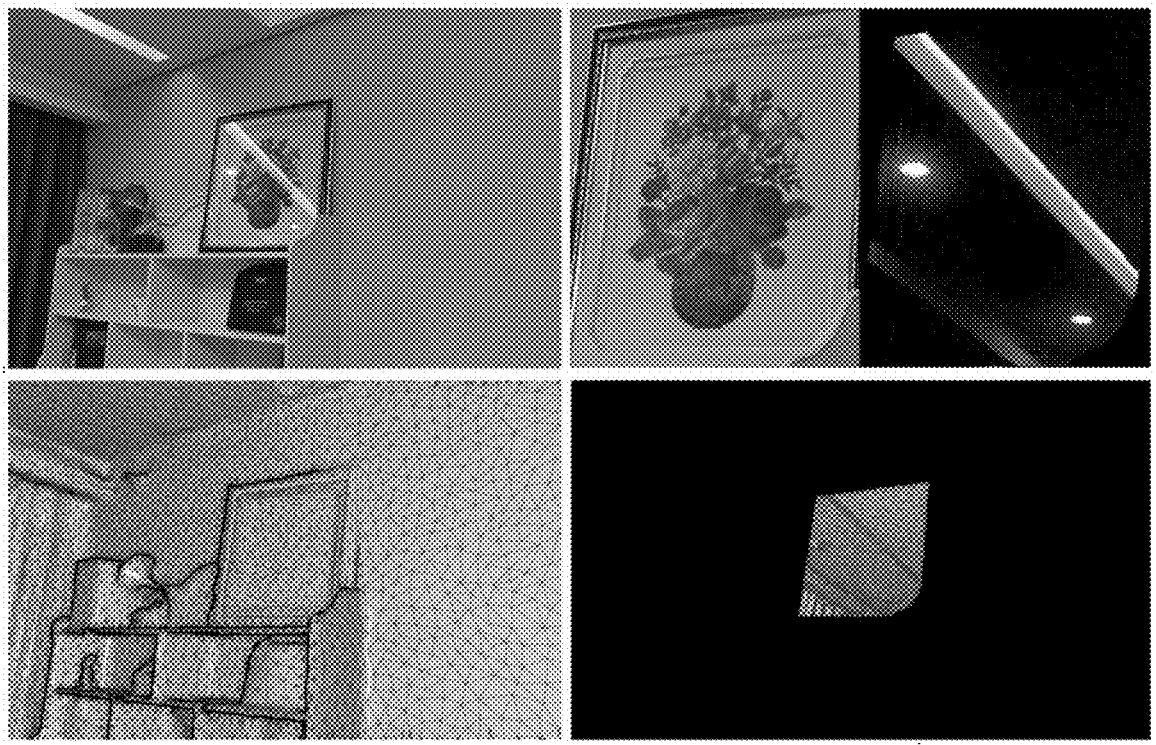
FIG. 3 is a schematic diagram of the construction result of the double-layer expression of a reflection area provided by the embodiment of the present disclosure.

(3) A plane in the global triangular mesh model is detected, and whether the plane is a reflection plane is detected by means of color consistency between adjacent images; if so, constructing a double-layer expression on a reflection area for each picture in which the reflection plane is visible to correctly render a reflection effect of an object surface. FIG. 3 is a schematic diagram of the construction result of the double-layer expression of a reflection area provided by the embodiment of the present disclosure.

The double-layer expression includes double-layer triangular meshes of foreground and background and two decomposed pictures of foreground and background. A foreground triangular mesh is used for expressing object surface geometry, and a background triangular mesh is used for expressing a mirror image of a scene geometry on the reflection plane; a foreground picture is used for expressing object surface textures after removing reflection components, and a background picture is used for expressing the reflection components of the scene on the object surface.

Specifically, firstly, planes in the global triangular mesh model are detected, planes with an area larger than an area threshold are reserved (the area threshold is 0.09 m² in this embodiment), the planes are projected onto visible pictures, and a set of pictures in which the planes are visible is recorded as $\mathcal{H}$; for each picture $I_k$ in $\mathcal{H}$, a set $\mathcal{N}_k$ of K neighboring pictures thereof is calculated (K=6 in this embodiment). In an embodiment, the calculation of K neighbors is obtained according to an ordering of overlapping rate of vertices in the global triangular mesh model after plane reflection, including the picture $I_k$ itself, whose overlapping rate is certainly the highest. Next, a matching cost volume is constructed using $\mathcal{N}_k$, see Sinha, Sudipta N., et al. "Image-based rendering for scenes with reflections." ACM Transactions on Graphics (TOG) 31.4 (2012): 1-10, whether the plane has enough reflection components in the picture $I_k$ is determined, which is specifically as follows: for each pixel, after mirroring the global triangular mesh model according to a plane equation, a cost corresponding to a mirrored depth value is found in the matching cost volume, and whether a cost position is a local minimum point is determined; if a number of pixels of the local minimum points of a cost in the picture is greater than a pixel number threshold (50 in this embodiment), it is considered that the plane has reflection components in the picture; if a number of visible pictures with reflection components in a certain plane is greater than a picture number threshold (5 in this embodiment), it is considered that the plane is the reflection plane.

Specifically, for each reflection plane, a two-dimensional reflection area $\beta_k$ thereof on each visible picture is calculated, specifically: the reflection plane (with three-dimensional boundaries) is projected onto the visible picture to obtain a projected depth map, the projected depth map is expanded (a 9×9 window may be used), and then the expanded projected depth map is compared with the aligned depth map in the previous step to obtain an accurate two-dimensional reflection area; for each pixel with a depth value in the projected depth map, screening is performed by three-dimensional point distances and normal included angles (the pixels whose three-dimensional point distance is less than 0.03 m and the included angle of normal is less than 60 degrees are kept), and a screened pixel area is taken as the reflection area $\beta_k$ of the reflection plane on the picture; meanwhile, the projected depth map is taken as an initial foreground depth map, the internal and external camera parameters of the picture are mirrored into a virtual camera according to the plane equation, then the initial background depth map in the virtual camera is rendered by using the global triangular mesh model, in which it should be noted that the near clip plane of the rendering needs to be modified to be a reflection plane; then the initial foreground and background depth maps are converted into simplified two layers of triangular meshes $M_k^0$ and $M_k^1$ according to the method in step 2).

Next, two layers of foreground and background pictures $I_k^0$ and $I_k^1$ are calculated by an iterative optimization algorithm, and $M_k^0$ and $M_k^1$ are further optimized; all related original pictures are subjected to an inverse gamma correction in advance for subsequent decomposition.

An optimization objective is to minimize the following energy function:

$$\underset{(R,T)_k^1, M_k^{0,1}, I_k^{0,1}}{\operatorname{argmin}} \quad E_d + \lambda_s E_s + \lambda_p E_p, \text{ s.t. } I_k^{0,1}(u) \in [0, 1]$$

where, $(R, T)_k^1$ in the optimization objective represents a rigid body transformation of a triangular mesh of a reflection layer, and initial values thereof are identity matrix and 0 respectively, and $M_k^0$ and $M_k^1$ only optimize the three-dimensional positions of mesh vertexes without changing topological structures; $E_d$, $E_s$ and $E_p$ are a data item, a smoothing term and a prior term respectively, and $\lambda_s$, $\lambda_p$ are the weights of respective items, which are 0.04 and 0.01 respectively, and u indicates a pixel in $I_k^{0,1}$; specifically:

$$E_d = \Sigma_{k' \in \mathcal{N}_k} \Sigma_u \|\hat{I}_{k'}(u) - I_k(u)\|^2$$

$$\hat{I}_{k'}(u) = I_{k'}^0(\omega^{-1}(u, D_k^0)) + \beta_{k'}(\omega^{-1}(u, D_k^0)) I_{k'}^1(\omega^{-1}(u, D_k^1))$$

$$E_s = \Sigma_u (e^{-\nabla I_k^{0,1}(u)} \|\nabla I_k^{0,1}(u)\|^2) + \Sigma_v \|HM_k^{0,1}(v)\|^2$$

$$E_p = \Sigma_u (\|I_k^0(u)\|^2) + \Sigma_u (\|i_k^1(u)\|^2)$$

where H is a Laplace matrix; a function $\omega^{-1}$ returns two-dimensional coordinates, and projects the point u in an image $I_{k'}$ to an image $I_k$ according to the depth value and the internal and external camera parameters; $D_k^{0,1}$ represents the depth map obtained by projection of $M_k^{0,1}$; v represents a vertex in $M_k^{0,1}$.

In order to minimize the above energy function, an alternating optimization solutions is used, and for each round of optimization, $(R, T)_k^1$ and $M_k^{0,1}$ are fixed first, $I_k^{0,1}$ is optimized. In an embodiment, an initial value of $I_k^{0,1}$ is calculated by the following formula:

$$I_k^0(u) = \min(\{I_{k'}^0(\omega^{-1}(u, D_k^0)) | k' \in \mathcal{N}_k\})$$

$$I_k^1(u) = I_k(u) - I_k^0(u)$$

The initial value is given, a nonlinear conjugate gradient method is used for optimization, with a total number of iterations of 30; next, $I_k^{0,1}$ is fixed, and $(R, T)_k^1$ and $M_k^{0,1}$ are optimized, for which the conjugate gradient method is also used, with a total number of iterations of 30; one alternation is one round of optimization, and two rounds of optimization in total are carried out for the whole optimization process, and after a first round of optimization, $I_k^{0,1}$ after the first round of optimization is denoised by consistency constraint of foreground pictures (surface colors) among multiple viewports, specifically: $I_k^0$ and $I_k^1$ after the first round of optimization are known, $k' \in \mathcal{N}_k$, and denoised images $\tilde{I}_k^0$ and $\tilde{I}_k^1$ are obtained by using the following formula:

$$\tilde{I}_k^0(u) = \operatorname{median}(\{I_{k'}^0(\omega^{-1}(u, D_k^0)) | k' \in \mathcal{N}_k\})$$

$$\tilde{I}_k^1(u) = \begin{cases} I_k(u) - \tilde{I}_k^0(u) & \text{if } I_k(u) - \tilde{I}_k^0(u) - I_k^1(u) < 0 \\ I_k^1(u) & \text{otherwise} \end{cases}$$

a second round of optimization is continually carried out using $\tilde{I}_k^0(u)$ and $\tilde{I}_k^1(u)$ as the initial values of $I_k^{0,1}$, and further, a prior term is added to a total energy equation in the second round of optimization:

$$\lambda_g (\Sigma_u \|I_k^0(u) - \tilde{I}_k^0(u)\|^2 + \Sigma_u \|I_k^1(u) - \tilde{I}_k^1(u)\|^2)$$

where $\lambda_g$ is the weight of the prior term for constraining the second round of optimization.

After two rounds of optimization, final two layers of a simplified triangular mesh $M_k^{0,1}$ and a decomposed $I_k^{0,1}$ are obtained by converting $M_k^1$ with $(R, T)_k^1$ for correctly rendering the reflection effect of the object surface.

Figure 4:
FIG. 4 is a schematic drawing result of a virtual viewpoint with reflection provided by an embodiment of the present disclosure.
Figure 5:
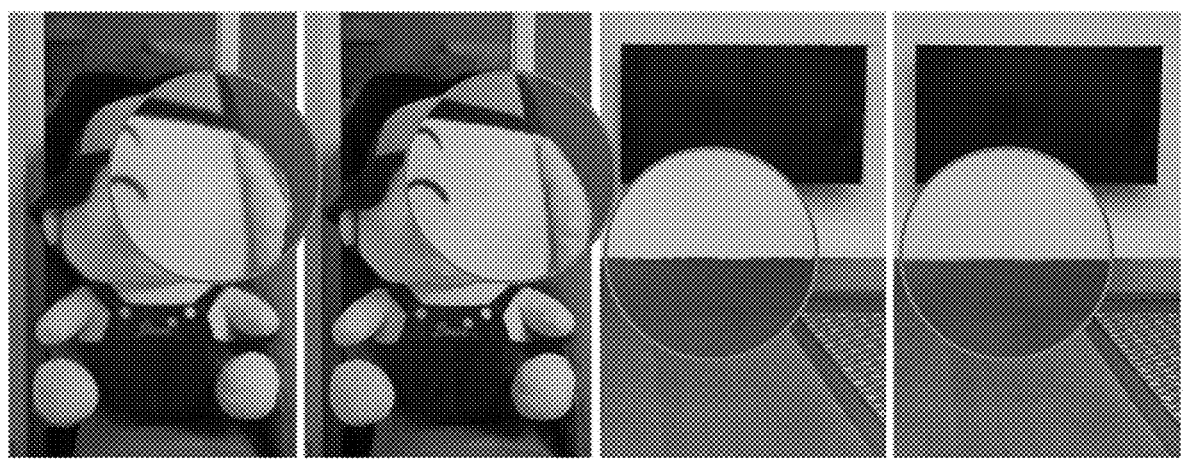
FIG. 5 is a comparison diagram of whether super-resolution neural network is used or not provided by an embodiment of the present disclosure.
Figure 6:
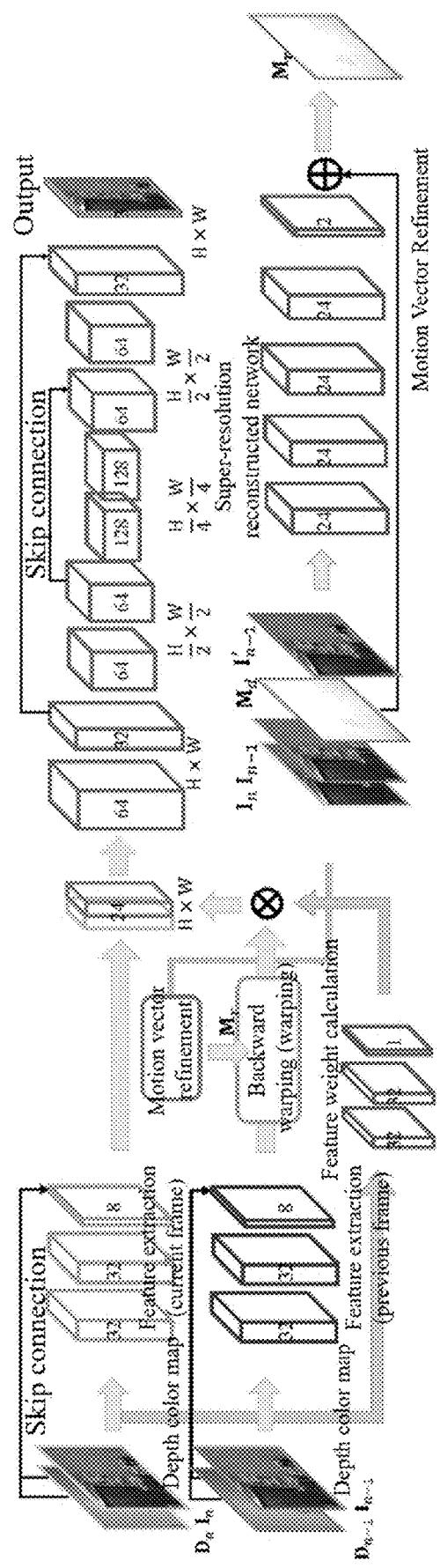
FIG. 6 is a structural diagram of a super-resolution neural network provided by an embodiment of the present disclosure.

(4) A virtual viewport is given, a virtual viewport picture is drawn by using neighborhood pictures and triangular meshes, and for the reflection area, drawing is performed by using foreground and background pictures and foreground and background triangular meshes. FIG. 4 is a schematic drawing result of a virtual viewpoint with reflection provided by an embodiment of the present disclosure.

Specifically, the goal of the online rendering process is to give the internal and external parameters of the virtual camera, and the output is the virtual picture corresponding to the virtual camera. Specifically: a set of neighborhood pictures is calculated according to the internal and external parameters of the virtual camera, and the local coordinate system of the current virtual camera is divided into eight quadrants according to a coordinate axis plane, and a series of neighborhood pictures are further selected in each quadrant, and each quadrant is further divided into several areas by using an included angle $\angle(R_k^z, R_n^z)$ between an optical center direction $R_k^z$ of a picture and an optical center direction $R_n^z$ of the virtual camera and a distance $\|t_k - t_n\|$ between an optical center $t_k$ of the picture and an optical center $t_n$ of the virtual camera; preferably, it is divided into nine areas, and the nine areas are the arrangement and combinations of $\angle(R_k^z, R_n^z)$ in [0°, 10°), [10°, 20°), [20°, ∞) and $\|t_k - t_n\|$ in [0, 0.6), [0.6, 1.2), [1.2, 1.8), respectively; next, in each area, one picture with a smallest similarity $d_k$ is selected to be added to the set of neighborhood pictures, $$d_k = \angle(R_k^z, R_n^z) * \pi / 180 + \lambda \|t_k - t_n\| / \|t_n\|,$$

where the distance proportion weight $\lambda$ is 0.1.

After obtaining the set of neighborhood pictures, each picture in the set of neighborhood pictures is drawn to a virtual viewpoint according to a corresponding simplified triangular mesh, specifically:

a) a robust depth map is calculated, and a rendering cost $c(t_k,t_n,x)$ is calculated for each pixel of a patch shader:

$$c(t_k,t_n,x)=\angle(t_k-x,t_n-x)*\pi/180+\max(0,1-\|t_n-x\|/\|t_k-x\|)$$

where $t_k$ and $t_n$ represent the three-dimensional coordinates of the optical centers of the picture and the virtual camera, x represents a three-dimensional coordinate of a three-dimensional point corresponding to the pixel, and each pixel have a series of triangular patches rendered, where the "point" is used to represent an intersection point of the patch and light ray determined by the pixel; if a rendering cost of a certain point is greater than a minimum rendering cost of all points in the pixel +a range threshold λ, which is 0.17 in this embodiment, then the point does not participate in the calculation of the depth map, so that the depths of all points participating in the calculation of the depth map are compared to take a minimum value as the depth value of the pixel.

b) After calculating the depth map of the virtual camera, the picture is taken as a texture map to the triangular mesh for drawing, and for each pixel of the picture of the virtual camera, the colors of the points near the depth map (with a distance less than 3 cm) are blended according to a set weight $w_k$ ($w_k=\exp(-d_k/0.033)$) to obtain a final rendered color.

Specifically, the reflection area $\beta_k$ in a neighborhood picture is also drawn to a current virtual viewpoint to obtain a reflection area $\beta_n$ of the current virtual viewpoint; for pixels in the reflection area, drawing is performed by using two layers of foreground and background pictures and simplified triangular meshes, and calculation of the depth map and color blending are performed for two layers of images respectively according to the above steps; since the two layers of pictures $I_k^0$ and $I_k^1$ are obtained by decomposition after inverse gamma correction, the two layers of blended images are added in a rendering stage, and a gamma correction is carried out once to obtain correct pictures with a reflection effect.

Specifically, in the above rendering step, in order to reduce a storage scale, all pictures are down-sampled to 1/n for storage (n≥1, n is 4 in this embodiment), and a virtual window is set to an original size during rendering. The resolution of the virtual viewpoint picture rendered in this way remains unchanged, but the picture will be blurred. In the next step, a super-resolution neural network is used to improve the definition.

Specifically, after each new virtual viewport is rendered to obtain depth pictures and color pictures, a deep neural network is used to reduce rendering errors and improve a definition. Specifically: the network uses the color pictures and depth pictures of a current frame in addition with the color pictures and depth pictures of a previous frame as an input; firstly, a three-layer convolution network is used to extract features from the depth pictures and color pictures of the current frame and the depth pictures and color pictures of the previous frame respectively, and next, the features of the previous frame are warped to the current frame, and an initial correspondence is obtained by depth map calculation; since the depth map is not completely accurate, an alignment module (which is implemented by a convolutional neural network with three convolutional layers) is further used to fit a local two-dimensional offset to further align the features of a preceding frame and a subsequent frame, and the aligned features of the preceding and subsequent frames are combined and input into the super-resolution module (implemented by a U-Net convolution neural network) to output high-definition pictures of the current frame.

In one embodiment, a computer device is proposed, which includes a memory and a processor. Computer-readable instructions are stored in the memory, and when executed by the processor, the computer-readable instructions cause the processor to execute the steps in the indoor scene virtual roaming method based on reflection decomposition in the above embodiments.

In one embodiment, a storage medium storing computer-readable instructions is proposed. When executed by one or more processors, the computer-readable instructions cause the one or more processors to execute the steps in the indoor scene virtual roaming method based on reflection decomposition in the above embodiments. The storage medium can be a non-volatile storage medium.

Those skilled in the art shall appreciate that all or part of the steps in various methods of the above embodiments can be completed by instructing related hardware through a program, which can be stored in a computer-readable storage medium, which may include: Read Only Memory (ROM), Random Access Memory (RAM), magnetic disk or optical disk, etc.

What is described above is only the preferred embodiment of one or more embodiments of this specification, and it is not intended to limit one or more embodiments of this specification. Any modification, equivalent substitution, improvement, etc. made within the spirit and principle of one or more embodiments of this specification shall be included in the scope of protection of one or more embodiments of this specification.

What is claimed is:

1. An indoor scene virtual roaming method based on reflection decomposition, comprising:
    step S1, capturing pictures sufficient for covering a target indoor scene, carrying out three-dimensional reconstruction for the target indoor scene based on the captured pictures, and obtaining internal and external camera parameters and a global triangular mesh model of the target indoor scene;
    step S2, for each picture, projecting the global triangular mesh model into a corresponding depth map, aligning depth edges to color edges, converting the aligned depth map into a triangular mesh, and performing mesh simplification on the triangular mesh;
    step S3, detecting a plane in the global triangular mesh model, and detecting whether the plane is a reflection plane by means of color consistency between adjacent images; when the plane is the reflection plane, constructing a double-layer expression on a reflection area for each picture in which the reflection plane is visible to correctly render a reflection effect of an object surface; wherein the double-layer expression comprises double-layer triangular meshes of foreground and background and two decomposed pictures of foreground and background, wherein a foreground triangular mesh is used for expressing object surface geometry, and a background triangular mesh is used for expressing a mirror image of a scene geometry on the reflection plane; a foreground picture is used for expressing object surface textures after removing reflection components, and a background picture is used for expressing the reflection components of the scene on the object surface; step S3 comprises the following sub-steps:
    sub-step S31, detecting planes in the global triangular mesh model, reserving planes with an area larger than an area threshold, projecting the planes onto visible pictures, and recording a set of pictures in which the planes are visible as $\mathcal{H}$; for each picture $I_k$ in $\mathcal{H}$, calculating a set $\mathcal{N}_k$ of K neighboring pictures thereof, wherein a calculation of K neighbors is obtained according to an ordering of overlapping rate of vertices in the global triangular mesh model after plane reflection;

constructing a matching cost volume using $\mathcal{N}_k$, determining whether the plane has enough reflection components in the picture $I_k$, wherein a determining method is as follows: for each pixel, after mirroring the global triangular mesh model according to a plane equation, finding a cost corresponding to a mirrored depth value in the matching cost volume, and determining whether a cost position is a local minimum point; when a number of pixels of the local minimum points of a cost in the picture is greater than a pixel number threshold, determining that the plane has reflection components in the picture; when a number of visible pictures with reflection components in a certain plane is greater than a picture number threshold, determining the plane to be the reflection plane;

sub-step S32, for each reflection plane, calculating a two-dimensional reflection area $\beta_k$ thereof on each visible picture, sub-step S32 comprises: projecting the reflection plane onto the visible picture to obtain a projected depth map, expanding the projected depth map, and comparing the expanded projected depth map with the aligned depth map to obtain an accurate two-dimensional reflection area; screening each pixel with a depth value in the projected depth map by three-dimensional point distances and normal included angles, and taking a screened pixel area as the two-dimensional reflection area $\beta_k$ of the reflection plane on the picture;

sub-step S33, constructing the double-layer expression on the reflection area for each picture in which the reflection plane is visible, sub-step S33 comprises: taking the projected depth map as an initial foreground depth map, mirroring internal and external parameters of the camera of the picture into a virtual camera according to the plane equation, rendering an initial background depth map in the virtual camera by using the global triangular mesh model, and converting the initial foreground depth map and the initial background depth map into simplified two layers of triangular meshes $M_k^0$ and $M_k^1$;

calculating two layers of foreground and background pictures $I_k^0$ and $I_k^1$ by an iterative optimization algorithm, and further optimizing $M_k^0$ and $M_k^1$, wherein all related original pictures are subjected to an inverse gamma correction in advance for subsequent decomposition;

an optimization objective is to minimize the following energy function:

$$\underset{(R,T)_k^1, M_k^{0,1}, I_k^{0,1}}{\operatorname{argmin}} \ E_d + \lambda_s E_s + \lambda_p E_p, \text{ s.t. } I_k^{0,1}(u) \in [0, 1]$$

where $(R, T)_k^1$ in the optimization objective represents a rigid body transformation of a triangular mesh of a reflection layer, and initial values thereof are identity matrix and 0, respectively, and $M_k^0$ and $M_k^1$ only optimize three-dimensional positions of mesh vertexes without changing topological structures; $E_d$, $E_s$ and $E_p$ are a data item, a smoothing term and a prior term, respectively, $\lambda_s$, $\lambda_p$ are weights of respective items, and u represents a pixel in $I_k^{0,1}$; the following relations are satisfied:

$$E_d = \sum_{k' \in N_k} \sum_u \|\hat{I}_{k'}(u) - I_{k'}(u)\|^2$$

$$\hat{I}_{k'}(u) = I_{k'}^0(\omega^{-1}(u, D_k^0)) + \beta_{k'}(\omega^{-1}(u, D_k^0))I_{k'}^1(\omega^{-1}(u, D_k^1))$$

$$E_s = \sum_u \left( e^{-\nabla I_k^{0,1}(u)} \|\nabla I_k^{0,1}(u)\|^2 \right) + \sum_v \|HM_k^{0,1}(v)\|^2$$

$$E_p = \sum_u (\|I_k^0(u)\|^2) + \sum_u (\|I_k^1(u)\|^2)$$

where H is a Laplace matrix; a function $\omega^{-1}$ returns two-dimensional coordinates, and projects the point u in an image $I_{k'}$ to an image $I_k$ according to the depth value and the internal and external camera parameters; $D_k^{0,1}$ represents the depth map obtained by projection of $M_k^{0,1}$; v represents a vertex in $M_k^{0,1}$;

in order to minimize the energy function, an alternating optimization solutions is used, and for each round of optimization, $(R, T)_k^1$ and $M_k^{0,1}$ are fixed, $I_k^{0,1}$ is optimized, wherein an initial value of $I_k^{0,1}$; is calculated by the following formula:

$$I_k^0(u) = \min(\{I_k^0, (\omega^{-1}(u, D_k^0) | k' \in \mathcal{N}_k\})$$

$$I_k^1(u) = I_k(u) - I_k^0(u)$$

the initial value is given, a nonlinear conjugate gradient method is used for optimization; $I_k^{0,1}$ is fixed, and $(R, T)_k^1$ and $M_k^{0,1}$ are optimized, for which the conjugate gradient method is used; one alternation is one round of optimization, and two rounds of optimization in total are carried out for the whole optimization process, and after a first round of optimization, $I_k^{0,1}$ after the first round of optimization is denoised by consistency constraint of foreground pictures among multiple viewports, specifically: $I_k^0$, and $I_k^1$, after the first round of optimization are known, $k' \in \mathcal{N}_k$, and denoised images $\tilde{I}_k^0$ and $\tilde{I}_k^1$ are obtained by using the following formula:

$$\tilde{I}_k^0(u) = \operatorname{median}\left(\{I_{k'}^0(\omega^{-1}(u, D_k^0))\} \mid k' \in \mathcal{N}_k\}\right)$$

$$\tilde{I}_k^1(u) = \begin{cases} I_k(u) - \tilde{I}_k^0(u) & \text{if } I_k(u) - \tilde{I}_k^0(u) - I_k^1(u) < 0 \\ I_k^1(u) & \text{otherwise} \end{cases}$$

a second round of optimization is continually carried out using $\tilde{I}_k^0(u)$ and $\tilde{I}_k^1(u)$ as initial values of $I_k^{0,1}$, and further, a prior term is added to a total energy equation in the second round of optimization:

$$\lambda_g \left( \sum_u \|I_k^0(u) - \tilde{I}_k^0(u)\|^2 + \sum_u \|I_k^1(u) - \tilde{I}_k^1(u)\|^2 \right)$$

where $\lambda_g$ is a weight of the prior term for constraining the second round of optimization;

after two rounds of optimization, final two layers of a simplified triangular mesh $M_k^{0,1}$ and a decomposed $I_k^{0,1}$ are obtained by converting $M_k^1$ with $(R, T)_k^1$ for correctly rendering the reflection effect of the object surface; and step S4, giving a virtual viewport, drawing a virtual viewport picture by using neighborhood pictures and triangular meshes, and for the reflection area, performing drawing by using foreground and background pictures and foreground and background triangular meshes, specifically: drawing the reflection area $\beta_k$ in a neighborhood picture to a current virtual viewpoint to obtain a reflection area $\beta_n$ of the current virtual viewpoint, wherein for pixels in the reflection area, drawing is performed by using two layers of foreground and background pictures and simplified triangular meshes, and calculation of the depth map and color blending are performed for two layers of images, respectively; since the two layers of pictures $I_k^0$ and $I_k^1$ are obtained by decomposition after inverse gamma correction, the two layers of blended images are added in a rendering stage, and a gamma correction is carried out once to obtain correct pictures with a reflection effect.

2. The indoor scene virtual roaming method based on reflection decomposition according to claim 1, wherein in step S2, the step of aligning the depth edges of the depth map to the color edges of the original picture to obtain the aligned depth map is specifically as follows:

a normal map corresponding to the depth map is calculated, a depth value $d_i$ of each pixel i in the depth map is converted into a three-dimensional point $v_i$ in a local coordinate system according to internal camera parameters, and a plane distance $dt_{ij}=\max(|(v_i-v_j)\cdot n_i|, |(v_i-v_j)\cdot n_j|)$ between adjacent points i,j is calculated, where $n_i, n_j$ are normal vectors of the points i,j, respectively; if $dt_{ij}$ is greater than $\lambda*\max(1, \min(d_i, d_j))$, the pixel is recorded as a depth edge pixel, where $\lambda$ is an edge detection threshold;

for each picture, after all the depth edge pixels are obtained, local two-dimensional gradients of the depth edges are calculated by Sobel convolution, and each depth edge pixel is taken as a starting point, and pixels are traversed one by one along an edge two-dimensional gradient direction and an opposite direction thereof at the same time until a color edge pixel is traversed at either one of the two sides; after the color edge pixel is traversed, the depth values of all pixels in a middle path from the starting pixel to the color edge pixel are deleted; the pixels the depth values of which are deleted are defined as misaligned pixels, and the pixels the depth values of which are not deleted are defined as aligned pixels; for each deleted depth value, interpolation filling is performed by using surrounding undeleted depth values.

3. The indoor scene virtual roaming method based on reflection decomposition according to claim 2, wherein for each deleted depth value, interpolation filling is performed by using the surrounding depth values that are not deleted, specifically: for each misaligned pixel $p_i$ to be interpolated, a geodesic distance $d_g(p_i, p_j)$ from the pixel $p_i$ to all other aligned pixels is calculated, and the m nearest aligned pixels are found by using the geodesic distance, and an interpolated depth value $$d_i = \sum_{j\in\mathcal{N}_i} \frac{w_g(i,j)}{\sum_k w_g(i,k)} \hat{d}_i^j$$

is calculated, where $\mathcal{N}_i$ represents a set of nearest aligned pixels of the pixel $p_i$, $w_g(i,j)=\exp(-d_g(p_i,p_j))$, and $\hat{d}_i^j$ represents the projection of the pixel $p_i$ onto a local plane equation of $p_j$, wherein the local plane equation is calculated from $v_j$ and $n_j$.

4. The indoor scene virtual roaming method based on reflection decomposition according to claim 1, wherein in step S4, a set of neighborhood pictures is calculated according to internal and external parameters of the virtual camera, and the local coordinate system of the current virtual camera is divided into eight quadrants according to a coordinate axis plane, and a series of neighborhood pictures are further selected in each quadrant, and each quadrant is further divided into several areas by using an included angle $\angle(R_k^z, R_n^z)$ between an optical center direction $R_k^z$ of a picture and an optical center direction $R_n^z$ of the virtual camera and a distance $\|t_k-t_n\|$ between an optical center $t_k$ of the picture and an optical center $t_n$ of the virtual camera; in each area, one picture with a smallest similarity $d_k$ is selected to be added to the set of neighborhood pictures, $d_k=\angle(R_k^z,R_n^z)*\pi/180+\lambda\|t_k-t_n\|/\|t_n\|$, where $\lambda$ is a distance proportion weight;

after obtaining the set of neighborhood pictures, each picture in the set of neighborhood pictures is drawn to a virtual viewpoint according to a corresponding simplified triangular mesh, specifically:

a) a robust depth map is calculated, and a rendering cost c $(t_k,t_n,x)$ is calculated for each pixel of a patch shader:

$$c(t_k,t_n,x)=\angle(t_k-x,t_n-x)*\pi/180+\max(0,1-|t_n-x|/|t_k-x|)$$

where $t_k$ and $t_n$ represent the three-dimensional coordinates of the optical centers of the picture and the virtual camera, x represents a three-dimensional coordinate of a three-dimensional point corresponding to the pixel, and each pixel have a series of triangular patches rendered, where the "point" is used to represent an intersection point of the patch and light ray determined by the pixel; when a rendering cost of a certain point is greater than a minimum rendering cost of all points in the pixel +a range threshold $\lambda$, the point does not participate in the calculation of the depth map, in such a manner that the depths of all points participating in the calculation of the depth map are compared to take a minimum value as the depth value of the pixel; and b) after calculating the depth map of the virtual camera, the picture is taken as a texture map to the triangular mesh for drawing, and for each pixel of the picture of the virtual camera, the colors of the points near the depth map are blended according to a set weight $w_k$ to obtain a final rendered color.

5. The indoor scene virtual roaming method based on reflection decomposition according to claim 1, wherein in step S4, in order to reduce a storage scale, all pictures are down-sampled to 1/n for storage, n≥1, and a virtual window is set to an original size during rendering.

6. The indoor scene virtual roaming method based on reflection decomposition according to claim 1, wherein a super-resolution neural network is trained to compensate for a definition loss caused by down sampling for storing the pictures, and to reduce possible drawing errors, which is specifically as follows: after each new virtual viewport is rendered to obtain depth pictures and color pictures, a deep neural network is used to reduce rendering errors and improve a definition; the network uses the color pictures and depth pictures of a current frame in addition with the color pictures and depth pictures of a previous frame as an input; a three-layer convolution network is used to extract features from the depth pictures and color pictures of the current frame and the depth pictures and color pictures of the previous frame respectively, the features of the previous frame are warped to the current frame, and an initial correspondence is obtained by depth map calculation; since the depth map is not completely accurate, an alignment module is further used to fit a local two-dimensional offset to further align the features of a preceding frame and a subsequent frame, and the aligned features of the preceding and subsequent frames are combined and input into the super-resolution module implemented by a U-Net convolution neural network to output high-definition pictures of the current frame.

* * * * *